O. W. COWGILL.
PAPER FEEDING MECHANISM.
APPLICATION FILED JULY 24, 1911.
1,134,375.
Patented Apr. 6, 1915.
12 SHEETS—SHEET 6.
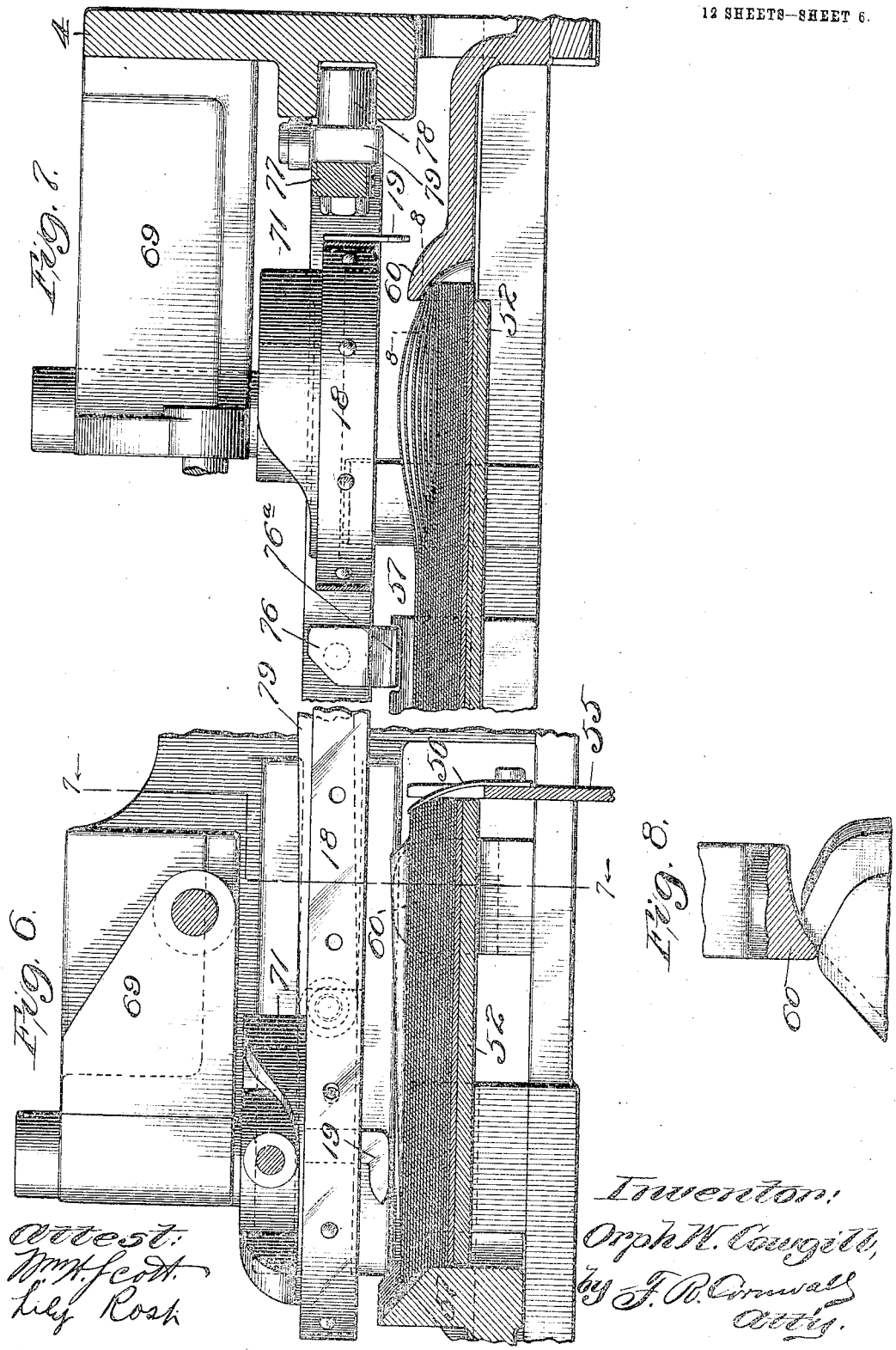

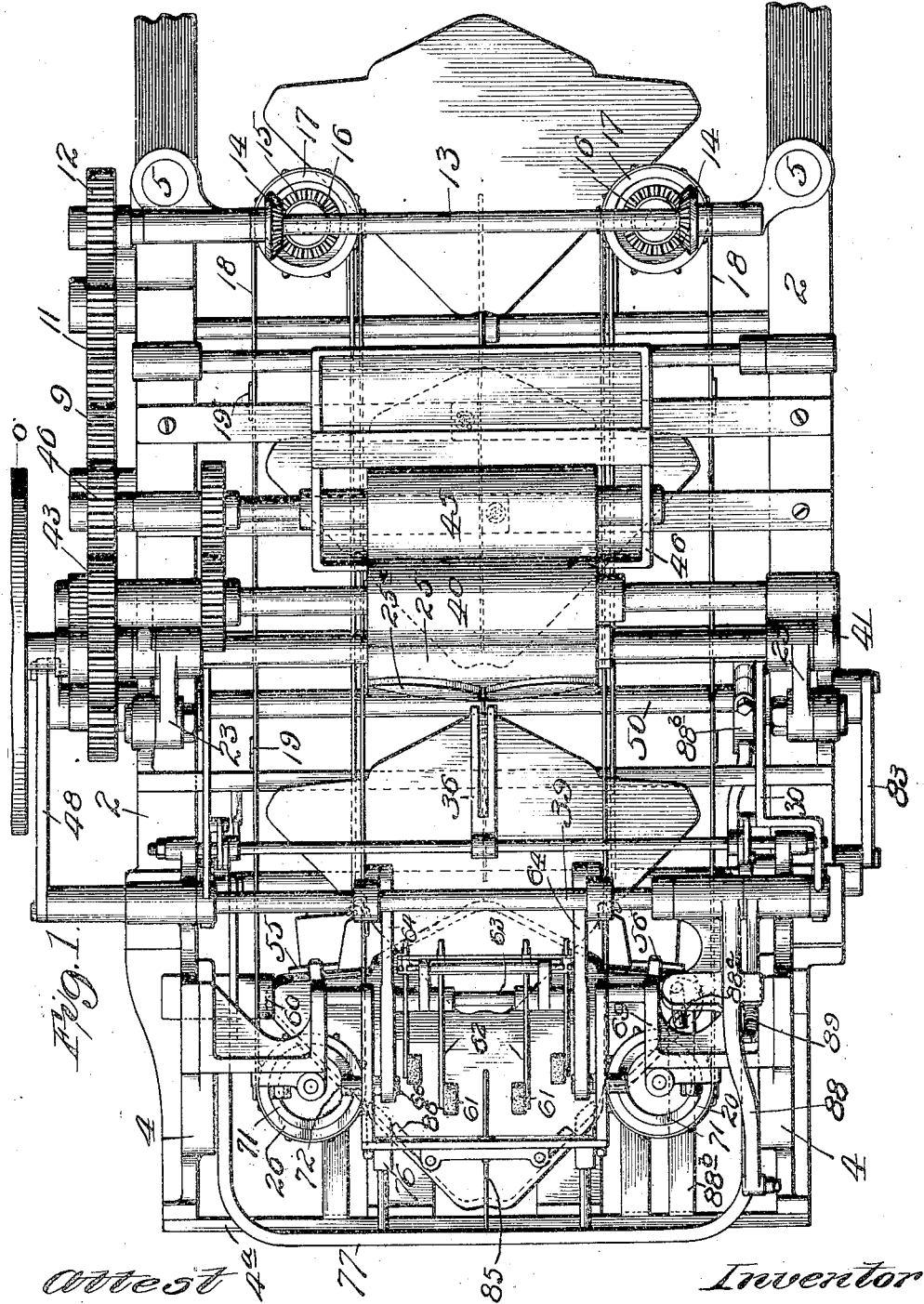

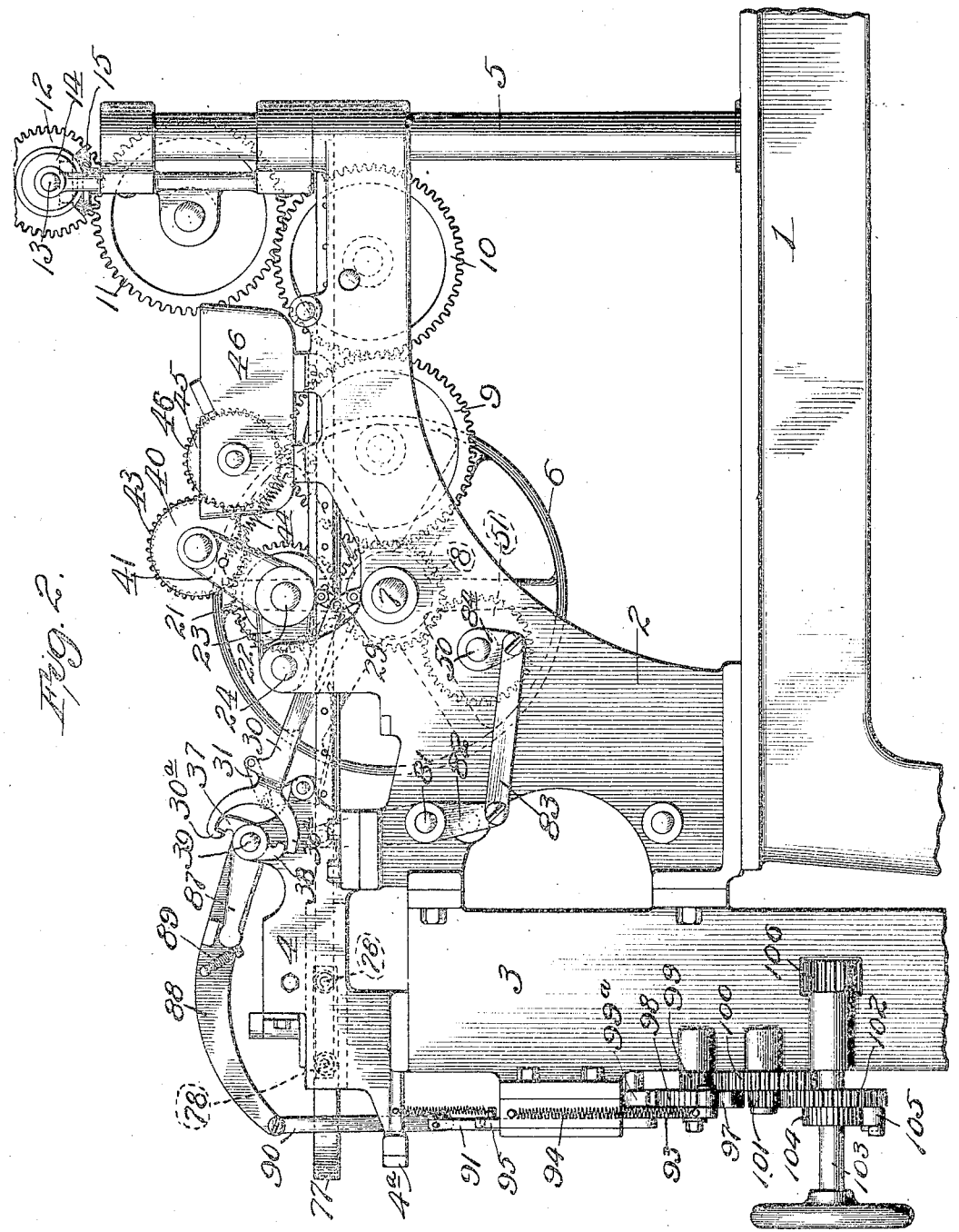

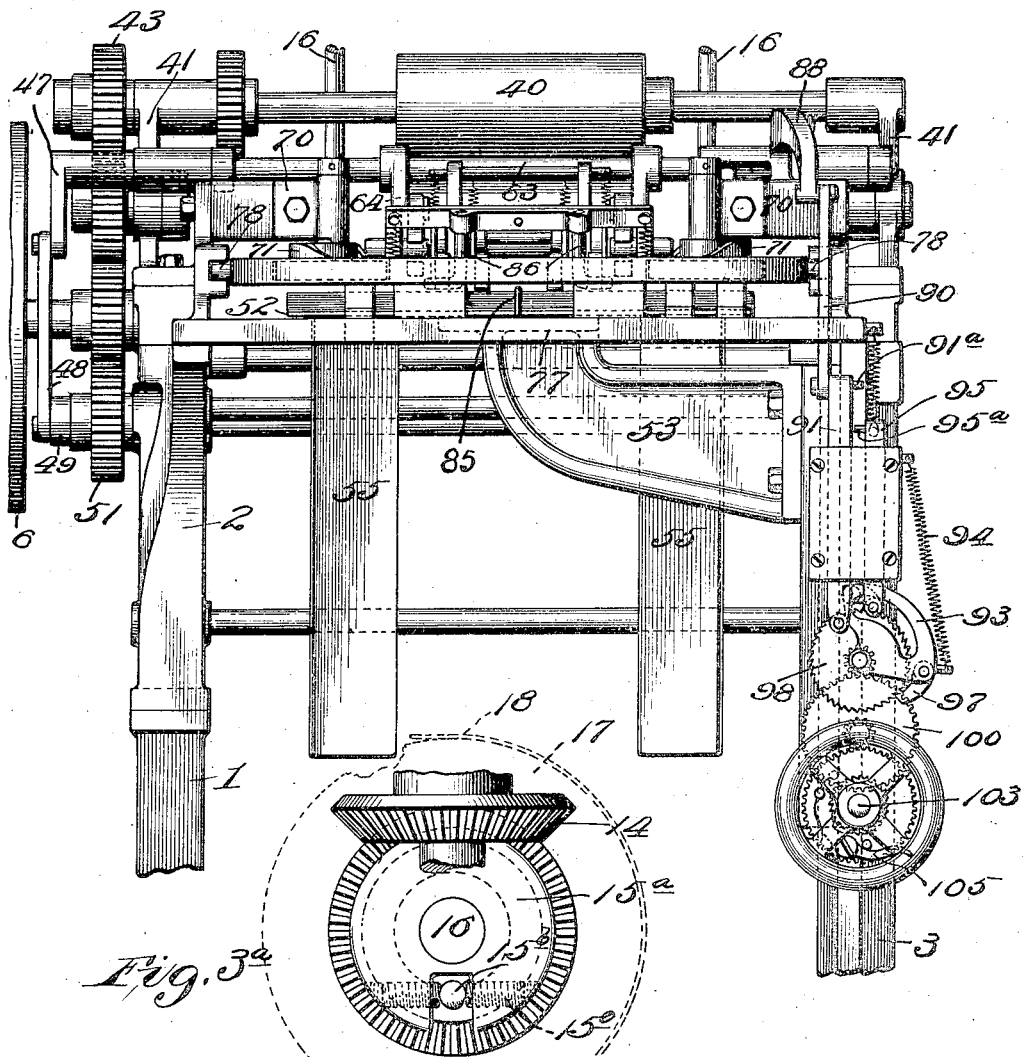

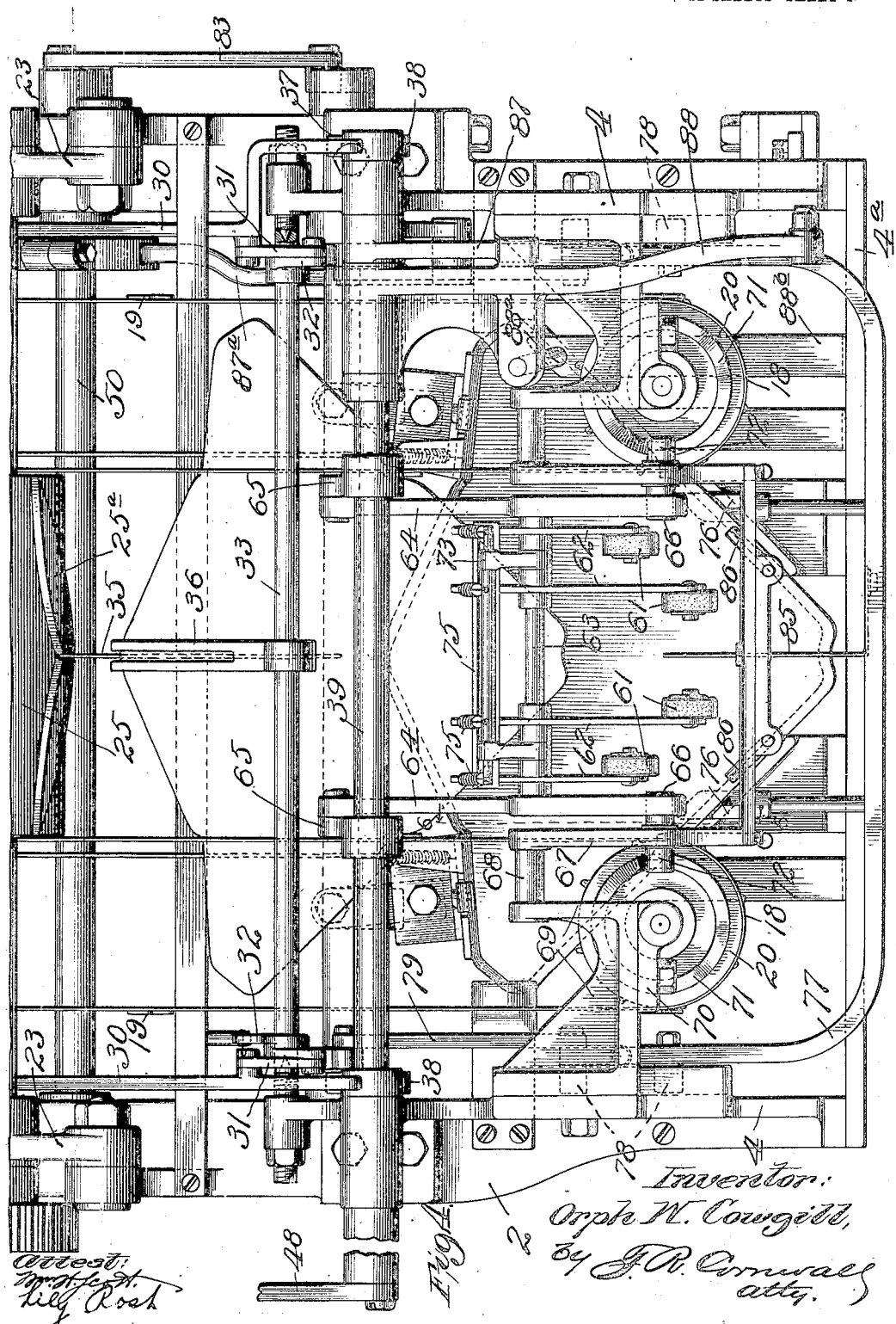

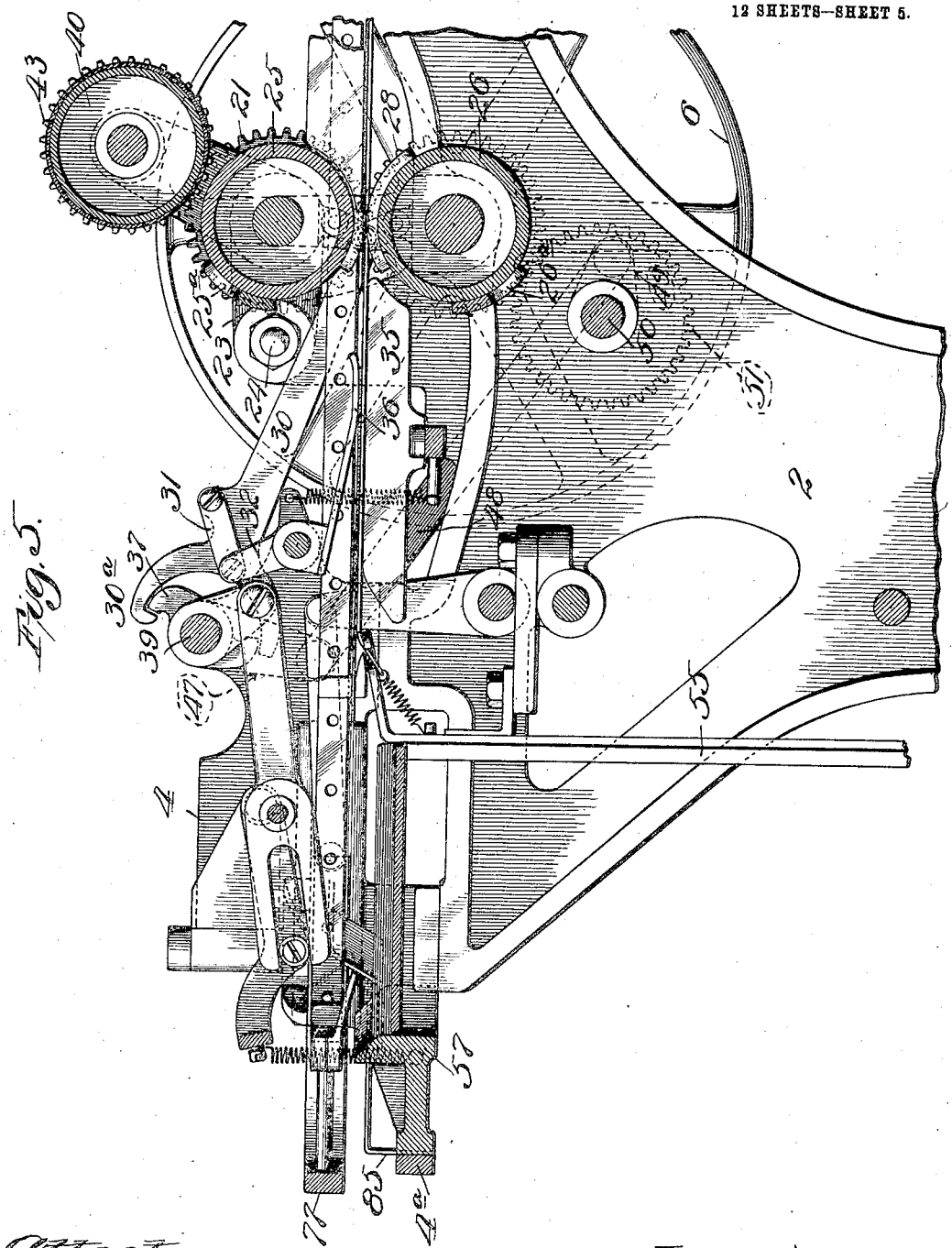

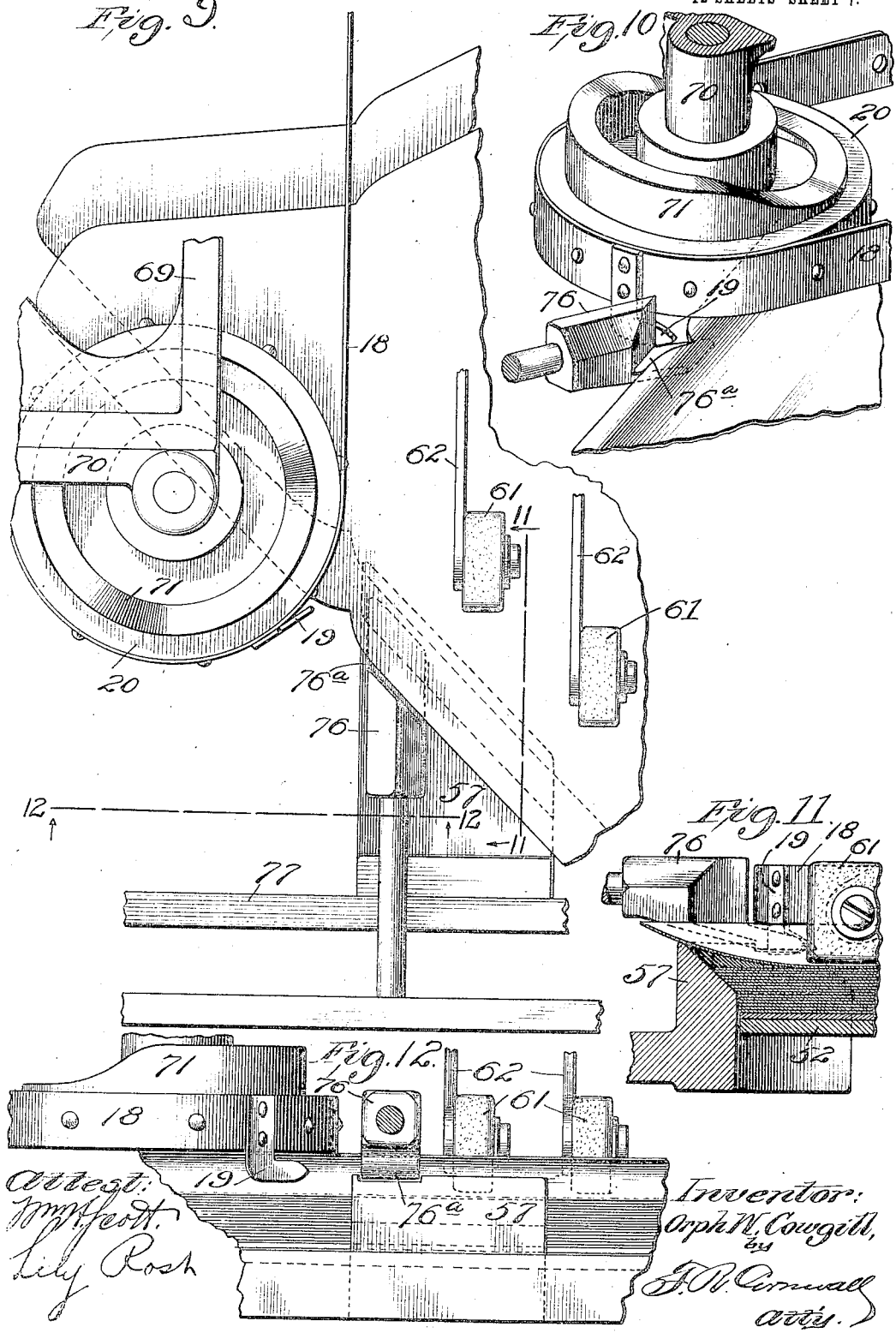

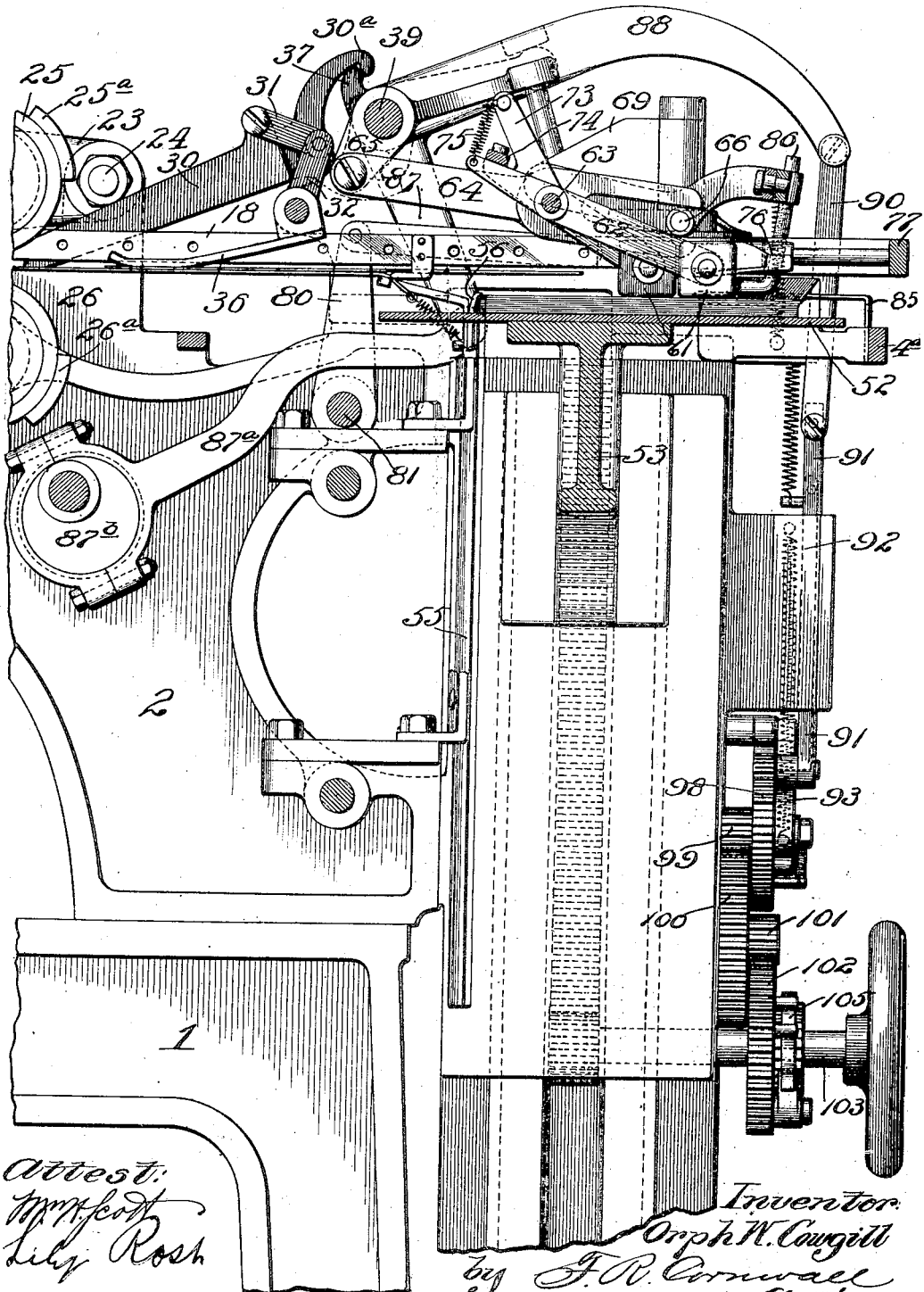

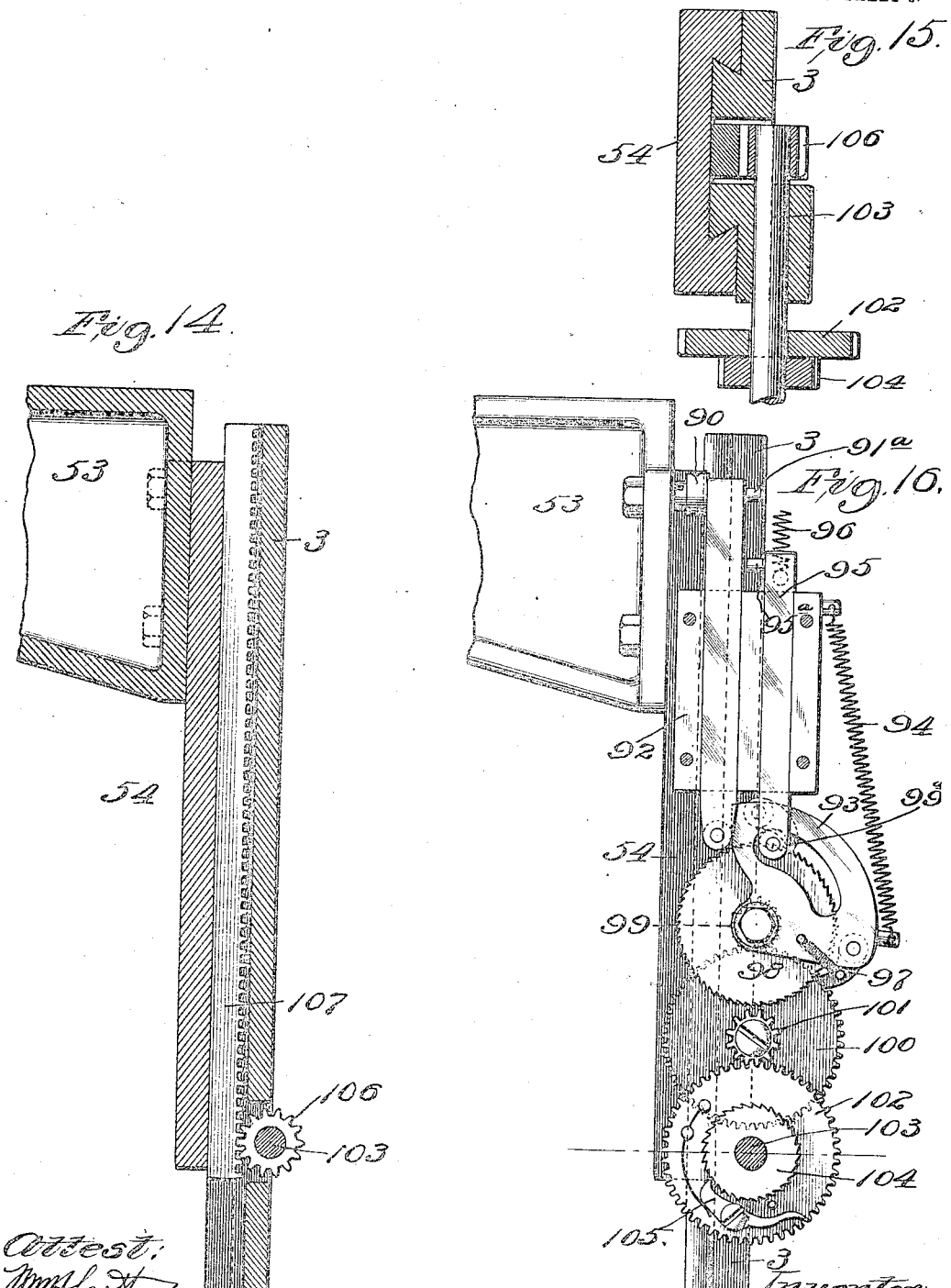

O. W. COWGILL.
PAPER FEEDING MECHANISM.
APPLICATION FILED JULY 24, 1911.

1,134,375.

Patented Apr. 6, 1915.
12 SHEETS—SHEET 10.

O. W. COWGILL.
PAPER FEEDING MECHANISM.
APPLICATION FILED JULY 24, 1911.
1,134,375.
Patented Apr. 6, 1915.
12 SHEETS—SHEET 11.
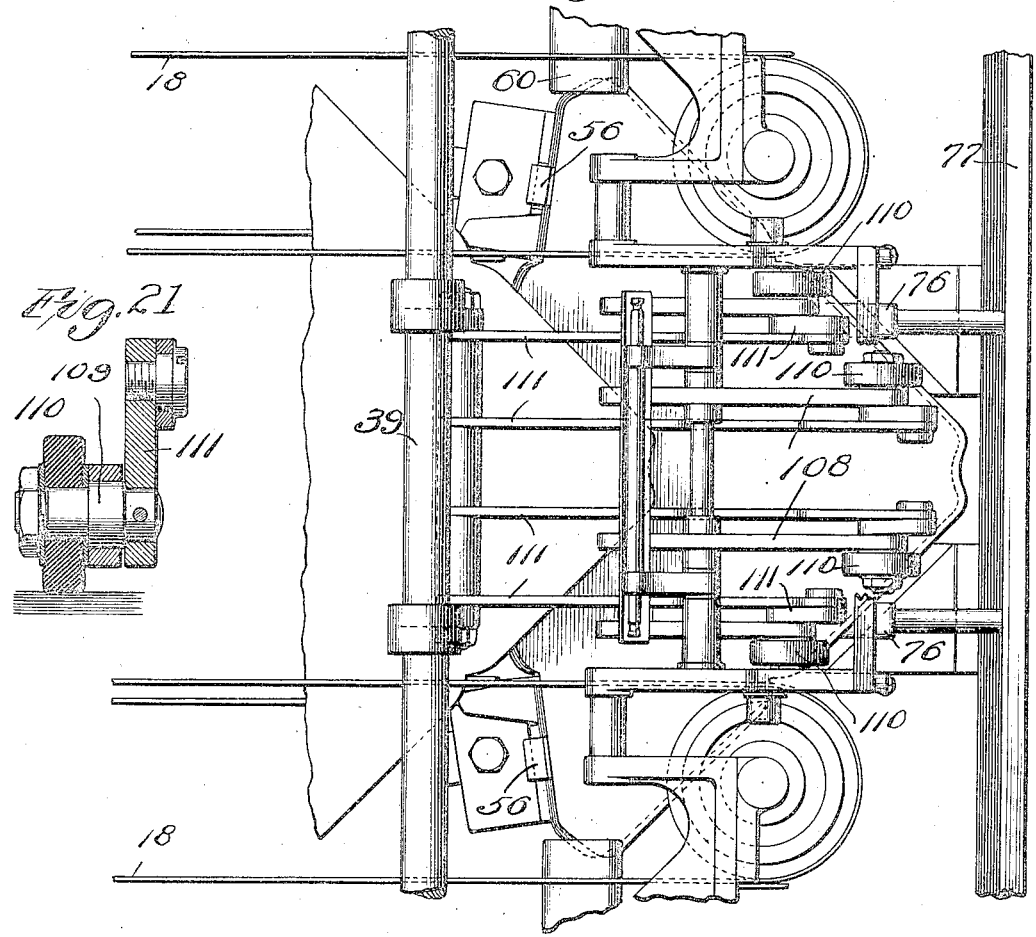
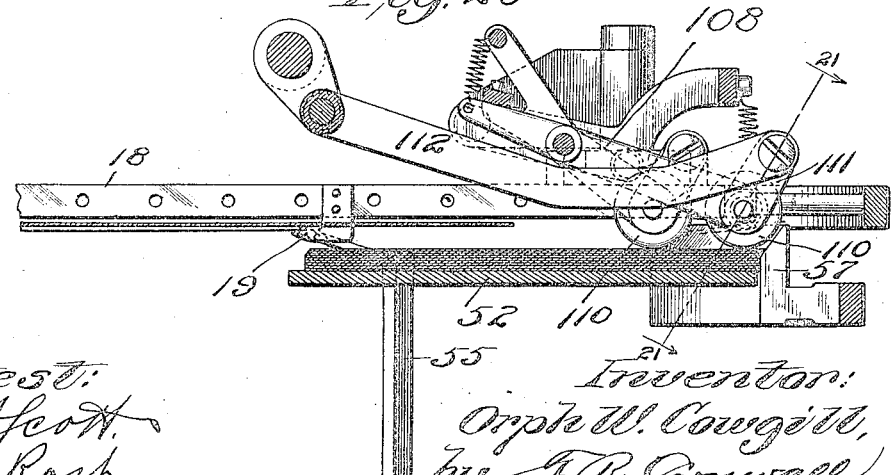

O. W. COWGILL.
PAPER FEEDING MECHANISM.
APPLICATION FILED JULY 24, 1911.
1,134,375.
Patented Apr. 6, 1915.
12 SHEETS—SHEET 12.
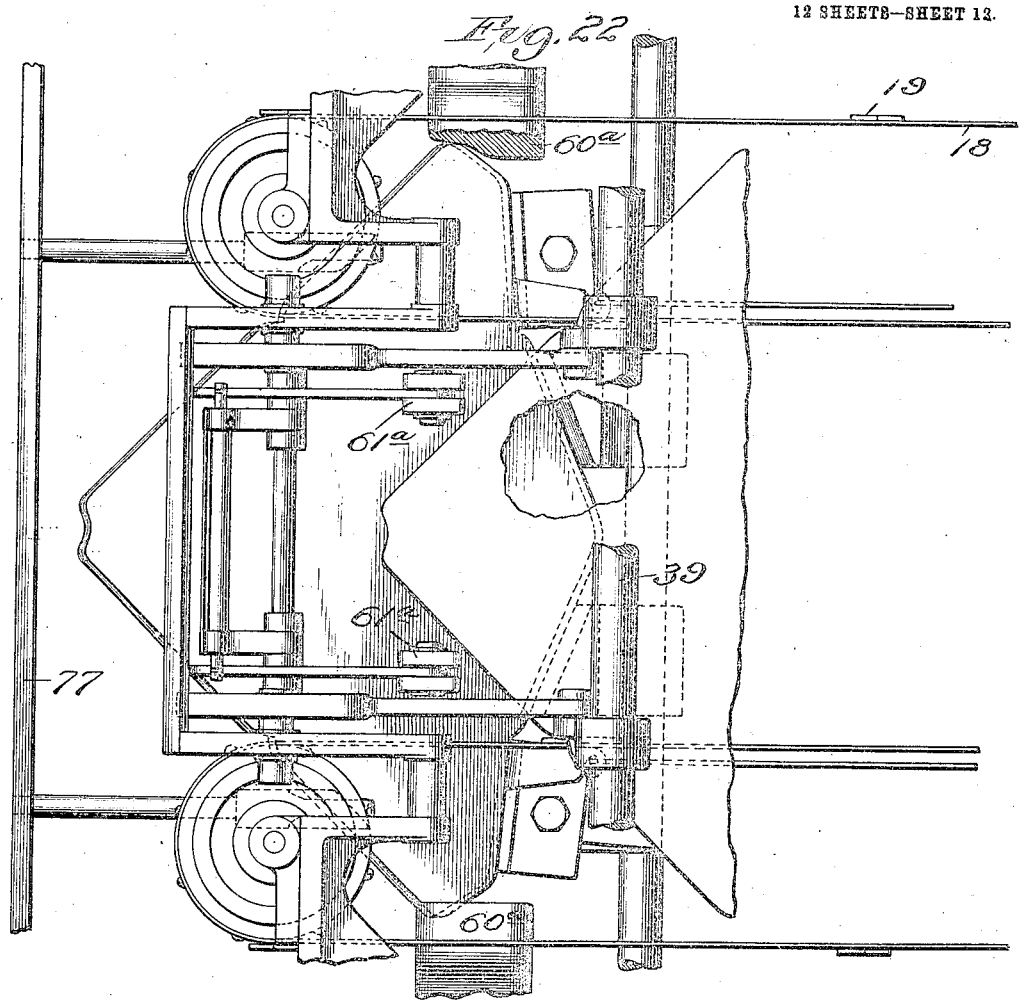
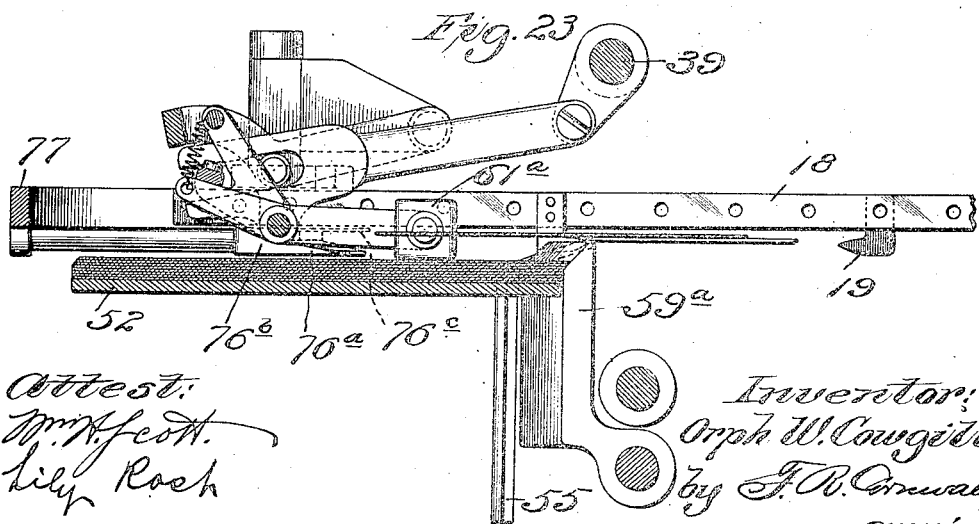

UNITED STATES PATENT OFFICE.

ORPH W. COWGILL, OF ST. LOUIS, MISSOURI, ASSIGNOR OF TWELVE ONE-HUNDREDTHS TO JACOB BONGNER, TWELVE ONE-HUNDREDTHS TO OTTO F. STIFEL, TWELVE ONE-HUNDREDTHS TO L. H. TIEMANN, AND TWELVE ONE-HUNDREDTHS TO A. G. SOLARI, ALL OF ST. LOUIS, MISSOURI, AND TWELVE ONE-HUNDREDTHS TO THE ENVELOPE MANUFACTURING COMPANY, OF ST. LOUIS, MISSOURI, A CORPORATION OF MISSOURI.

PAPER-FEEDING MECHANISM.

1,134,375.

Specification of Letters Patent.

Patented Apr. 6, 1915.

Application filed July 24, 1911. Serial No. 640,190.

*To all whom it may concern:*

Be it known that I, ORPH W. COWGILL, a citizen of the United States, residing at St. Louis, Missouri, have invented a certain new and useful Improvement in Paper-Feeding Mechanisms, of which the following is a full, clear, and exact description, such as will enable others skilled in the art to which it appertains to make and use the same, reference being had to the accompanying drawings, forming part of this specification, in which—

Figure 1 is a top plan view of my improved paper feeding mechanism. Fig. 2 is a side elevational view of the same. Fig. 3 is a front elevational view. Fig. 3ª is a detail view of a means for adjusting the delivery bands with respect to their driving mechanism. Fig. 3ᵇ is a side elevational view of said adjusting means. Fig. 4 is an enlarged plan view of the front portion of said mechanism. Fig. 5 is a vertical sectional view of the same. Fig. 6 is an enlarged sectional view on line 6—6 Fig. 4. Fig. 7 is a sectional view on line 7—7 Fig. 6. Fig. 8 is a horizontal sectional view on line 8—8 Fig. 7. Fig. 9 is an enlarged plan view of a fragmentary portion of the feeding mechanism, showing the sheet separating mechanism. Fig. 10 is a detail view showing the sheet separating mechanism. Fig. 11 is a sectional view on line 11—11 Fig. 9. Fig. 12 is a sectional view on line 12—12 Fig. 9. Fig. 13 is a vertical sectional view looking toward the right-hand side of the mechanism. Fig. 14 is a vertical sectional view showing detail of the elevator. Fig. 15 is a horizontal sectional view through the same. Fig. 16 is a side elevational view of the same. Fig. 17 is a front elevational view of the automatic means for separating the gumming rolls when the sheet fails to be fed or the sheets are exhausted. Fig. 18 is a vertical sectional view through said mechanism. Fig. 19 is a top plan view of a modified form of feeding mechanism. Fig. 20 is a vertical sectional view through said modified form. Fig. 21 is an enlarged sectional view on line 21—21 Fig. 20. Fig. 22 is a top plan view of another modified form of said feeding mechanism. Fig. 23 is a vertical sectional view through the same.

This invention relates to a new and useful improvement in paper feeding mechanisms, designed particularly for feeding blanks to be fed to envelop-making machines, although it is obvious that my improved mechanism is useful in connection with the feeding of sheets of paper from a stack or pile for other purposes.

My present invention contemplates the automatic lifting of the stack of sheets to be fed, which mechanism is controlled by the height of the sheets in the pile, and it also contemplates the selection and separation of the top sheet of the pile, lifting the same from the next adjacent sheet so as to provide an air cushion thereunder, which will not only permit its ready removal from the pile without dragging with it the next adjacent sheet, but said air cushion also insures the correct and proper operation of the selecting fingers which operate upon said separated sheet to place it in position to be carried off by the traveling mechanism.

By constructing a machine to meet the above requirements, I am enabled to operate the feeding mechanism at an exceptionally high rate of speed, the selection and separation of the top sheet from the stack or pile being positive and certain. This is highly desirable, not only in envelop-making machines, but in paper feeding mechanisms for printing presses, and other devices, where a regular and continuous feeding is necessary to insure proper and correct operation.

With these objects in view, my invention consists in the construction, arrangement and combination of the several parts, all as will hereinafter be described and afterward pointed out in the claims.

Referring now to Figs. 1 to 5, inclusive: 1 indicates a support shown as a casting, which may be a part of the framing of an envelop forming machine, or machine of other kind. 2 are side frames arranged upon the support 1, and forming a support for the shafts of my improved feeding mechanism. To the front end of one of the castings 2 is secured casting 3 for supporting the mechanism identified with the automatically liftable stack support or elevator, while side castings 4 are arranged on each side and in front of the upper ends of castings 2 for supporting other parts of the feeding mechanism. The rear ends of castings 2 are supported by posts 5. Power is communicated to the mechanism by means of a belt passing around pulley 6 mounted on a shaft 7. Shaft 7 is provided with a pinion 8 which meshes with a pinion 9, geared by means of gears 10, 11 and 12 to drive a shaft 13 on which miter gears 14 mesh with miter gears 15 arranged on the upper ends of vertical shafts 16. On the lower ends of shaft 16 are spur wheels 17, the spurs of which fit in suitable perforations of a belt 18. This belt is preferably in the form of a steel band, and as shown in Figs. 5, 6, 7, 10, 12 and 13, is provided, at proper distances apart, with dependent L-shaped carrying fingers 19, by means of which the top sheet is conveyed from the pile and delivered to the envelop or other machine to be operated upon. Belt 18 passes around spur wheels 20 located at the forward end of the feeding mechanism, and in such relation to the stack of sheets that the carrying fingers 19 will, when the top sheet is lifted, engage said top sheet and move the same rearwardly. The rearmost spur wheels being driven, it is unnecessary to separately drive the forward spur wheels, as said forward spur wheels merely act as idlers to support belt 18 in working position. The pinion 8 on shaft 7, before referred to, also drives the pinion 21 mounted on a shaft 22, said shaft 22 being journaled in arms 23, pivotally mounted at 24 to the side frames 2. On shaft 22 is a gumming or printing roller 25 (see Fig. 18), having printing type or rubber gumming projections 25ª on its peripheral edge, which coöperate with a rotary platen or platens 26ª extending beyond the surface of the roller 26 mounted on shaft 7. This shaft is provided with a gear 28, which meshes with the gear 21 before referred to, both gears being of the same diameter and provided with gear teeth which are of such length that when said rollers are separated, which will occur upon the failure of feeding mechanism or the exhaust of the sheets from the stack, the printing or gumming projections 25ª will not get out of registration with the platens 26ª.

The means for effecting the separation of the rollers 25 and 26 consists of toggle links 29 pivotally mounted to the bearings of said rollers, as shown in Fig. 18, and in the separation of the rollers, only the upper one 25 is lifted, as the shaft 7, on which the lower roller is mounted, has fixed bearings in the side frames 2. Toggle links 29 are provided at each end of roller 25, and to these toggle links are connected bars 30 pivotally supported by links 31 to bell cranks 32 mounted on a cross shaft 33. To one end of each bell crank lever is connected a spring 34, tending at all times to move the bars 30 in position to be operated by the rocking tappets hereinafter described.

As the blank is carried by the belts 18 rearwardly, it is supported by bars 35, of which three are shown, the two side bars being arranged parallel to and close to the innermost portions of the carrying belts 18. The third bar or support is arranged approximately at the center of travel of the blanks, and is straddled by a bifurcated bar 36 (see Fig. 1) which is mounted upon the shaft 33, and which bar 36, when a blank is being fed thereunder, is lifted so as to bring the hooked portion 30ª under control of the upper tappet 37. If there is any interruption in the feeding of the blanks, the feeling bar 36 drops to the position shown in full lines in Fig. 18, in which position it places the lower portion 30ᵇ of the bifurcated end of each bar 30 under control of the lower tappet 38, whereby when the shaft 39 on which these tappets 37 and 38 are fixedly mounted is operated, the bars 30 will be moved rearwardly to the dotted line position shown in Fig. 18, straightening the toggle links 29 and lifting the roller 25.

The object in lifting the roller 25 is to prevent the gum of the projections 25ª from being delivered to the platen projections 26ª in the absence of a blank, or if the projections 25ª contain printing type, to prevent said type from making a printing impression on the platen projections 26ª, and thereby producing an objectionable "offset."

The means for delivering gum to the projections 25ª, or ink to the type, as the case may be, comprises a distributing roller 40 (see Figs. 1 and 2) mounted in the ends of arms 41 pivotally arranged upon the shaft 22. This distributing roller is driven by means of a gear 43 meshing with a gear 21. The arms 41 are yieldingly drawn rearwardly by means of springs 44, so that the distributing roller 40 will be held in yielding contact with the gumming or inking roller 45 arranged in the pot 46 containing the gum or ink. Roller 45 is provided with a gear 46 in mesh with the gear 43. The purpose of making the roller 40 yielding, is to compensate for any irregularities in its surface, as said roller is made of composition material, and the object of swinging the roller 40 from the shaft 22 is to preserve the proper relation to the gumming or printing projections 25ª.

The shaft 39 carrying the tappets 37 and 38 is provided with a rock arm 47 (see Fig. 5), and is connected by link 48 to a crank arm 49 on a shaft 50 journaled in the side frames 2. This shaft 50 is rotated by means of a gear 51 meshing with the gear 8. In this manner, at each revolution of gear 51, shaft 39 is rocked, and in the event that a blank lies under the feeling bar 36, the lower end 30ᵇ of each bar 30 lies below its coöperating tappet 38, as shown in Figs. 2 and 5, and consequently the hooked upper end 30ᵃ of each bar 30 is in a position to coöperate with tappets 37, whereby the toggle 29 is broken and the gumming or printing roller lowered into operating position. When the feeling bar drops to the position shown in full lines in Fig. 18, due to the absence of a blank, then at the next rocking movement of shaft 39, the hooked projection 30ᵃ is lifted out of the path of its tappet 37, and the lower forward ends 30ᵇ of bars 30 are placed behind the tappets 38, so that when the shaft 39 is rocked, the tappets 38 will move the bars 30 rearwardly, straightening the toggle links 29 and moving them to positions of dead centers, in which positions of the toggles the roller 25 will be held lifted, and will remain so lifted until another blank is fed under the feeling finger 36. In this positive movement of the bars 30 rearwardly, it will be observed that the feeling fingers 36 are depressed farther than their normal fall, as shown by the dotted lines in Fig. 18; hence when another blank or series of blanks is fed to the machine, the first blank will lift the feeling finger 36, breaking the toggle and placing the hooked projection 30ᵃ in position to move the bars 30 forwardly, and drop the roller 25 in operative position.

It will be understood that the vibrations of the tappets 37 and 38 are idle with respect to the bar 30, except at such times as the feeding finger 36 is dropped or lifted, and in this manner, when a continuous series of blanks is being fed between the rollers 25 and 26, the bar 30 remains unmoved. When an interruption occurs in the feeding, or the last blank has been fed between the rollers, then the dropping of the feeling finger effects the lifting of the roller 25, which will remain so lifted until another blank or series of blanks is fed between the rollers.

The elevator which supports the stack of blanks is indicated at 52 (see Fig. 13), and comprises a flat plate arranged upon a bracket arm 53 (see Fig. 3), which bracket arm is secured to a supporting casting 54 having a dove-tail groove in its outer face, coöperating with a correspondingly shaped guiding rib on the inner face of casting 3. I will describe the operation of automatically raising this elevator, later, but for present purposes, I will state that the stack of sheets is arranged upon the elevator and bear at their rear edges against fixed vertical guiding strips 55 (see Figs. 3 and 13), said strips being secured by suitable brackets to cross bars arranged between the side frame castings. As the blanks are fed upwardly, the blanks at the top of the pile are forced forward slightly, as shown in Figs. 4, 5 and 6, by means of the bent plates 56 arranged at the upper ends of the guiding strips 55. This forward displacement of the top blanks is also assisted by means of the picking fingers hereinafter described.

The side frame castings 4 are connected at their forward ends by means of a cross bar 4ᵃ, which cross bar supports resisting members 57, which members have inclined upper edges, as shown, to accommodate the forwardly displaced upper sheets. In addition to placing the upper sheets, as the elevator rises, under the control of the picking fingers, the said top sheets, or rather the lateral extremities thereof, are brought into contact with the concave faces of buckling members 60 (see Fig. 7), whose concavity is so disposed that it will not only cause the top sheets to have a tendency to buckle upwardly as they are raised, but also to buckle as said top sheets are pushed forwardly to an abnormal position by the picking fingers. The lateral edges of the blank will be moved beyond the restraining influence of these buckling members 60, so that when the separating fingers move under the top sheet to carry the same rearwardly, the said lateral extremities thereof will be free from and pass over the buckling members and be placed in position to be caught by the conveying hooks 19. In Fig. 8 I have shown the concavity of the buckling members, and their effect upon the top sheet when said top sheet is moved forward by the picking fingers. From this it will be observed that the forward edges of the buckling members are narrower than the extreme width of the blanks, and hence as said top sheet is moved forwardly, its lateral extremities are forced past this constricted opening and the buckling is thus excessive at the time that the picking fingers are operating on the top sheet, but only with respect to the top sheet. It is by virtue of this buckling that the top sheet is separated from its companions, and due to its movement by the picking fingers, is placed under the control of the separating fingers.

The picking fingers referred to are preferably in the form of rubber blocks 61 (see Figs. 4 and 9 to 13). These blocks are mounted upon the forward ends of arms 62, which arms are pivotally mounted upon a shaft 63, said shaft being carried by slotted rocking arms 64 fixed to the rock shaft 39. The forward or slotted ends of these arms coöperate with rollers 66, mounted upon the frame 67, pivotally mounted at 68 to brackets 69 secured to the inner faces of the frame castings 4. Bracket 69 has a bearing 70, in which is mounted the shaft of spur wheel 20, and conjoined to this spur wheel is a side-faced cam 71 (see Fig. 10). The roller 72 on each arm 67 coöperates with each cam 71, and hence the forward ends of arms 64 are raised and lowered as the rear ends of said arms move in the arc of a circle described by their pivotal point of connection with the rock arms 65. The result of these motions is to impart to the picking fingers or block 61 an elliptical path of movement, their downward and forward dip causing them to engage to feed the top sheet forwardly, and their upward and rearward movement restoring them in position to engage the next succeeding blank after the top blank has been caught by the conveying fingers 19 and moved rearwardly. In this operation of the picking fingers, which are preferably made of rubber to give them better frictional contact with the uppermost blank, the buckled sheets are caused to pulsate, and these pulsations force the air thereunder and avoid suction due to possible vacuums which might be created by close contact resulting from the compacted pile of sheets. This pulsating action of the top sheets, of course, diminishes gradually as the sheets are further removed from the top, and conversely, has a greater effect upon the sheets as they approach the top, until finally, when the sheet is brought under the control of the picking fingers and becomes the top sheet, said top sheet has become sufficiently freed by the distribution of air thereunder and separated from the next adjacent sheet, as to be readily moved forward up the incline of the resisting members 57.

The shaft 63 on which the picking fingers 62 are pivotally mounted, has bracket arms 73 affixed thereto (see Fig. 13), which bracket arms carry a cross bar 74, against which the rear ends of the fingers 62 are yieldingly drawn by means of springs 75. In this manner, friction blocks 61 have yielding contact with the top sheet, which may be increased or diminished by adjusting the tension of the springs 75.

The separating fingers are indicated at 76, and are shown in Figs. 4 and 9 to 13, inclusive. These separating fingers have a rearwardly extending shelf-like projection 76$^a$, which is designed to pass beneath the top blank as the same is lifted up the incline of the resisting element 57, as shown in Fig. 11. The shelf-like portion 76$^a$ is preferably inclined downwardly, and operates in a groove in the upper edge of the resisting element 57, so that when the sheet is moved forwardly by the picking fingers, and its forward edge carried beyond the resisting element, and just about the time that the picking fingers are rising to release the sheet, the separating fingers 76 move rearwardly and carry with them the separated sheet. In this movement, the inclination of the portion 76$^a$ tends to raise the separated sheet and place it in position to be caught by the conveying fingers 19. As the conveying fingers 19 move at a uniform speed, it is obvious that it would not be practical to bring the conveying fingers 19 against the separated sheet while the latter is stationary. I therefore impart to the separating fingers a differential motion which first starts the separated sheet slowly, and then increases its speed so that when the sheet is picked up by the conveying fingers, no injury will result thereto. The means for thus differentially operating the separating fingers is as follows: Referring to Figs. 2, 4 and 13, it will be seen that each of the separating fingers is connected by means of a shank to a bail-like bar 77, which is guided in its horizontal movement by the rollers 78 shown in dotted lines in Fig. 2, operating in a groove in the rear end of said side frame. The rear ends of this bar 77 are connected by links 79, to rock arms 80 mounted on a shaft 81. This shaft 81 has a rock arm 82 at one end, connected by a link 83 to a crank arm 84 mounted on shaft 50. At each revolution of the crank arm 84 through the means just described, the separating fingers are differentially reciprocated, and when about midway their stroke and at their highest speed, the conveying members 19 pick up the blank and carry it onward. Bar 4$^a$ has on it a drag wire 85, which lies substantially over the center of the front edge of the sheet, whose function is to hold the center of the sheet down while the inclined faces of the resisting blocks cause the side edges of said sheet to be flared upwardly, to be caught by the separating fingers. In this manner, the top sheet or blank is held under restraint at all times and prevented from bounding or becoming displaced, due to the rapid operation of the machine. The front cross bar of the bail 67 is provided with bearings, in which are adjustably mounted L-shaped bars 86, whose feet lie substantially parallel to the inclined faces of the resisting blocks 57, and constitute curling members whereby as the top blank is forced up the incline, it is held down by the curling members and caused to curl upwardly, in readiness to be acted upon by the separating fingers.

Referring now to the elevator and the means for operating same, whereby the sheets are automatically raised so that the top sheet will be placed under the control of the mechanism above described: My improved elevating mechanism is designed to lift the stack of sheets automatically and place the top sheet under the control of the feeding mechanism, regardless of the thickness of the sheets. In this way, I am enabled to feed sheets of different thicknesses, and the elevating mechanism will be automatically operated to raise the pile of sheets a distance according to the thickness of the sheet or sheets removed. Rock shaft 39 before referred to forms a pivot for a bell crank lever 87, whose forward end lies under the projection of an arm 88 (see Fig. 130

2), a spring 89 holding the arm 88, which is loosely pivoted on the shaft 39, in operative relation to the arm 87. The lower member of bell crank 87 is connected to an arm 87ª which is operated by an eccentric 87ᵇ mounted on shaft 50. A link 90, connected to the forward end of arm 88, extends down and is connected to a sliding bar 91, operating in a grooved guiding block 92 secured to the casting 3. The lower end of this reciprocating bar 91 carries a roller which coöperates with a cam-quadrant 93. A spring 94 connected to this cam-quadrant 93 tends to rock the same and move the cam faces thereof over the roller on the lower end of bar 91, whenever permitted to do so by its controlling medium. This controlling medium consists of a bar 95 mounted in the block 92, and normally held upwardly by a spring 96. The bar 95 has a roller on its lower end which coöperates with an eccentric cam face in the quadrant 93.

In Fig. 16, the parts are normal and the roller on bar 95 lies against that portion of the eccentric face which is at the greatest radial distance from the axis of movement of the quadrant. Hence, notwithstanding the reciprocation of bar 91, and the displacement of its roller with respect to the cam face on the quadrant, the quadrant cannot be operated by its spring 94. Bar 91 is provided with a pin 91ª, which in its reciprocation is intended to contact with a pin 95ª on bar 95 and depress bar 95 whenever the pile of blanks which controls the stroke of bar 91 is reduced in height. This control is shown in Figs. 4 and 13, and consists of a post 88ª mounted on the arm 88, and whose lower end coöperates with a yielding plate 88ᵇ lying above the pile of blanks, as shown in Fig. 4. The purpose of thus interposing the yielding plate 88ᵇ between the post and the pile of blanks is to prevent the arc of movement of the post from exerting a rearward drag upon the top blank. The plate makes a square contact with the blank, and hence does not interfere with its forward movement under the action of the picking fingers. In this manner, as the sheets or blanks are fed from the top of the pile, the height of the pile becomes gradually diminished, and each stroke of arm 88 becomes longer, until finally the pin 91ª contacts with the pin 95ª and forces the bar 95 downwardly. At the time that bar 95 is forced downwardly, bar 91 is also in its lowered position, and hence when the quadrant cam is released by the bar 95, its spring will move it against the roller on the lower end of bar 91. Bar 91 will be positively lifted by the arm 87 engaging the arm 88, and this positive upward movement of bar 91 restores the quadrant cam back to normal position. This restoration effects an upward feeding of the elevator through the medium of a pawl 97, engaging a ratchet 98. 99ª is a restraining pawl to prevent backward rotation of ratchet 98. Ratchet 98 is conjoined to a pinion 99, meshing with a gear 100, conjoined to a pinion 101 in mesh with a gear 102 mounted loosely on a shaft 103, upon which shaft is fixed a ratchet 104. A spring pressed pawl 105 on gear 102 couples shaft 103 with the gear in the raising movement of the elevator. This pawl is provided with a finger piece, as shown in Fig. 16, which enables the pawl to be released and the elevator lowered for the purpose of renewing the pile of blanks. Shaft 103 has a pinion 106 conjoined thereto (see Figs. 14 and 15), which meshes with a rack 107 on elevator frame 54.

From the above, it will be seen that the elevator may be lowered to renew the pile of blanks, and when the blanks are in position, the elevator operating mechanism will automatically raise the pile of blanks into proper position to be fed. If the post 88ª and its plate 88ᵇ, before referred to, do not contact with the pile of blanks, the quadrant cam will make a full stroke with each operation of the machine, and in this manner the elevator will be, comparatively speaking, rapidly raised. When, however, the pile of blanks reaches the proper position so that the top blank may be separated and fed, if the blanks are thin, the post 88 might make one or two strokes without releasing the quadrant cam. When the stroke, however, is of such length that the quadrant cam is released, said quadrant cam will only move such portion of its stroke as is permitted by the depressed position of bar 95. Whatever portion this is will enable the feed pawl 97 to grip a new tooth or teeth, so that the bar 91 can positively effect the feeding of the elevator on its rising stroke.

In Figs. 3ª and 3ᵇ I have shown means for securing a fine adjustment of the conveying bands 18, which is necessary to secure proper time relations of the fingers 19 with respect to the other parts of the machine with which they coöperate. This means of adjustment consists in mounting the pinions 15 loosely on their shafts, and said pinions being held upwardly in position by bracket extensions from the side frames. Collars 15ª are pinned to the upper ends of shafts 16. Each collar is provided with a slot or opening, into which extends a pin 15ᵇ from the pinions 15. Screws 15ᶜ, threaded into the collar and extending into the opening on each side of said pin, enable the collar, its shaft and spur gear 17, together with band 18, to be adjusted with respect to the pinion, which pinion bears a fixed relation to its coöperating pinion 14.

The bearings for the spur wheels are preferably mounted in such manner that they can be laterally adjusted to accommodate the conveyer bands to different sizes of envelops, or for any other purposes.

Referring now to Figs. 19, 20 and 21, wherein I have shown a modified form of picking finger arm 108, which is substantially the same as the picking finger heretofore described, except that at its forward end it is provided with a bearing in which is loosely mounted a stud 109 carrying a friction disk 110 clamped thereto. Stud 109 is pinned in an arm 111, to the upper end of which is connected a crank, operated by rock arms of the shaft 39. In other respects, the construction is the same as that heretofore described, with the following exception: The arms 108 have no forward and backward movement, but only a vertical movement. When the friction disks 110 are lowered into contact with the top blank, they are rocked by means of the shaft 39, so that the forward edges of the blank will be forced up the inclined faces of the resisting blocks, and after the separating fingers start to move forward, the friction disks are raised and rocked back to normal position in readiness for another operation. By this four-motion mechanism, I am enabled to accomplish substantially the same results as are produced by the picking fingers hereinbefore described.

Referring now to modification shown in Figs. 22 and 23: I have herein disclosed a mechanism by which, instead of starting the top blank in a direction opposite that in which it is fed, in order to separate it from the pile, I initially move the top blank in the direction of its feed and accomplish its separation from the pile. To do this, the resistance blocks 59ª are placed so as to coöperate with the rear edges of the blanks, and the feeding blocks 61ª, which are operated by substantially the same mechanism as before described, with the exception that they feed rearwardly instead of forwardly, are so set that on their downward and rearward stroke they will feed the top blank so that the lateral extremities thereof will be forced between the buckling members 60ª and held buckled while being initially fed rearwardly. The separating fingers 76ᵇ are spaced more widely apart than those heretofore described, and in their forward movement, do not pass in front of the pile of sheets, but normally lie over said pile. The feeling blocks 61ª move the top sheet behind the separating fingers, thus enabling the separating fingers on their rearward differential stroke to pick up the buckled sheet and not only start it rearwardly, slowly at first and then rapidly, but place it in position to be caught by the conveying fingers 19. The separating fingers in this instance, instead of having one rearwardly extending shelf-like projection 76ª, are provided with an upper shelf-like projection 76ᶜ which prevents the sheet from rising and coming into contact with the forward spur wheels.

What I claim—

1. In a paper feeding mechanism, the combination of separating mechanism and conveyer bands for picking up the separated sheet, said bands approaching said sheet in directions converging toward the medial line of said sheet, and leaving said sheet in directions diverging from its medial line.

2. In a paper feeding mechanism, the combination of separating mechanism and delivery bands traveling in horizontal planes around vertically disposed axes, said separating means being adapted to separate sheets from a pile and deliver them to said bands.

3. In a paper feeding mechanism, the combination of means for separating the top sheet from a pile, and delivery bands having fingers for engaging the separated top sheet, said fingers approaching said sheet in converging lines and leaving said sheet in diverging lines.

4. In a paper feeding mechanism, the combination of picking means for separating the top sheet from a pile and moving it bodily, feeding means adapted to receive said separated sheet from the picking means and start it in the direction of its feed, and delivery means for carrying said top sheet onward.

5. In a paper feeding mechanism, the combination of picking means for selecting the top sheet and moving it to a feeding means, feeding means for advancing said top sheet in the direction of its feed, and delivery means for carrying said top sheet onward at an accelerated speed.

6. In a paper feeding mechanism the combination of means for buckling the top sheet and moving it into position for engagement by a feeding means, and a feeding means for engaging said sheet and starting it in the direction of its feed.

7. In a paper feeding mechanism the combination of a feeding means, and means for buckling the top sheet to permit its engagement by the feeding means, means for operating the feeding means to engage said buckling sheet and advance it at an accelerated speed in the direction of its feeding movement.

8. In a paper feeding mechanism, the combination of a feeding means normally out of engagement with the top sheet, means for buckling the top sheet to place it in position for engagement by the feeding means, and means for moving said feeding means into engagement with the sheet and moving the sheet in the direction of its feed at a gradually increasing speed, and delivery means for engaging said sheet and carrying it onward.

9. In a paper feeding mechanism, the combination of means for buckling the top sheet, and means for intermittently engaging said top sheet while it is buckled to produce an undulating action of the buckled portions thereof, distributing the air under the top sheet and freeing it from the pile.

10. In a paper feeding mechanism, the combination of means for buckling the uppermost sheet and holding it buckled, and means for operating upon the top sheet to produce pulsations whereby air is caused to be distributed therebetween to effect a separation thereof.

11. In a paper feeding mechanism, the combination of means for buckling the uppermost sheets, and means for displacing the top sheet with respect to the next adjacent sheet while said top sheet is held buckled, said last mentioned means operating with a kneading action upon the subjacent buckled sheets.

12. In a paper feeding mechanism, the combination of means for displacing a plurality of the sheets at the top of the pile, means for buckling said displaced sheets, and means for abnormally displacing the uppermost sheet while it is held buckled.

13. In a paper feeding mechanism, the combination of means for buckling the top sheets, means for holding the top sheet at its center against buckling, and means for intermittently exerting pressure upon buckled portions of said top sheet on each side of its center.

14. In a paper feeding mechanism, the combination of means for operating upon the lateral extremities of the sheet to buckle the same, means for holding the center of the sheet against buckling, and means for kneading the sheet at points between its center and each side, for producing undulations to distribute the air under the sheet and effect its separation from the pile.

15. In a paper feeding mechanism, the combination of means for displacing the top sheet or sheets, picking fingers for moving the top sheet only, inclined faces arranged in front of the edges of the top sheet, to curl said advancing edges when said sheet is moved by said picking fingers, and separating fingers adapted to pass beneath the curled edge of the sheet to engage the sheet and feed it forward.

16. In a paper feeding mechanism, the combination of picking fingers for displacing the top sheet, inclined resisting faces in advance of the edges of said displaced sheet, and curling members for coöperating with the said resisting faces, to effect a curl at the edges of the displaced sheet as the same is forced over said resisting faces.

17. In a paper feeding mechanism, the combination of picking fingers for bodily displacing the top sheet, means for buckling the said top sheet as it is displaced, and separating fingers for engaging the buckled top sheet and initially moving it in the direction of its feed.

18. In a paper feeding mechanism, the combination of means for buckling the top sheet, picking fingers which successively engage each top sheet at the buckled portion thereof, whereby pulsations are produced to force air under said top sheet and effect its separation, and separating fingers for engaging the top sheet when said top sheet is free to move.

19. In a paper feeding mechanism, the combination of means for buckling the top sheet or sheets, inclined faces over which the top sheet is forced, picking fingers for forcing the top sheet over said inclined faces, means for curling the edges of the top sheet as it is forced over said inclined faces, and separating fingers for engaging the buckled portions of said top sheet.

20. In a paper feeding mechanism, the combination of means for buckling the top sheet, means for shifting the sheet bodily while buckled, and separating fingers for engaging with said top sheet at its buckled portions, said separating fingers comprising a head portion having inclined shelf-like extensions for passing under the top sheet.

21. In a paper feeding mechanism, the combination of converging members for buckling the top sheet, friction elements for engaging said top sheet, and means for rocking said friction elements while in engagement with said top sheet to impel the sheet between the converging members.

22. In a paper feeding mechanism, the combination of means for buckling the uppermost sheets, friction elements, arms for moving said friction elements into and out of engagement with the top sheet, whereby to produce an undulatory movement of the buckled sheets, and means operating independently of said arms for rocking said friction elements to displace the top sheet after engagement therewith is effected.

23. In a paper feeding mechanism, the combination of means for elevating sheets, means for buckling the sheets at the top of the pile, said means comprising gradually converging faces which engage the lateral edges of the sheets and produce such buckling effect as the sheets are elevated, said buckling means also having longitudinally converging faces whereby the sheets are further buckled as they are displaced laterally.

24. In a paper feeding mechanism, the combination of buckling means having vertical converging faces, means for elevating the pile of sheets against such faces to effect such buckling, said buckling means also having longitudinally converging faces, and means for moving the sheets laterally to auxiliate their buckling.

25. In a paper feeding mechanism, the combination of buckling faces designed to contact with the edges of the upper sheets, said faces converging vertically and horizontally, means for elevating the pile of sheets to force them against said buckling faces, picking fingers for moving the top sheet laterally, said picking fingers producing a pulsation in the buckled sheets so as to distribute air therebetween, means for restraining the central portions of the sheets against buckling, and separating fingers for operating upon the top sheet when presented thereto by the picking fingers.

26. In a paper feeding mechanism, the combination of means for elevating a stack of sheets, means for bodily displacing the top sheet on the stack in the line of feeding movement, and means adapted to engage said last mentioned sheet to feed it forward at an accelerated speed.

27. In a paper feeding machine, the combination of means for elevating a stack of sheets, means for buckling the uppermost sheets on the stack as it is elevated, and picking fingers adapted to displace the topmost sheet bodily on the stack and at the same time impart an undulatory movement to the subjacent buckled sheets.

28. In a paper feeding mechanism, the combination of means for moving a sheet longitudinally, members adapted to engage the lateral extremities of said sheet to cause it to buckle when fed longitudinally, and members adapted to engage beneath said sheet when buckled and feed it forward.

29. In a paper feeding mechanism, the combination of means for elevating sheets, laterally disposed delivery bands traveling above the sheet when in delivery position, said delivery bands being provided with depending members adapted to carry the sheet, and means for manipulating the sheet to place it in position to be engaged by said depending members.

30. In a paper feeding machine, the combination of means for elevating a stack of sheets, delivery bands provided with depending members adapted to engage beneath a sheet, and means for separating the top sheet from the stack and placing it in the path of movement of said depending members, said separating means including mechanism for imparting the initial movement to said sheet.

In testimony whereof I hereunto affix my signature in the presence of two witnesses, this 22nd day of July, 1911.

ORPH W. COWGILL.

Witnesses:
F. R. CORNWALL,
LILY ROST.